(12) United States Patent
Peterson

(10) Patent No.: US 11,549,425 B2
(45) Date of Patent: Jan. 10, 2023

(54) ENGINE DAMPER COOLING UTILIZING CAB A/C CIRCUIT

(71) Applicant: AGCO Corporation, Duluth, GA (US)

(72) Inventor: Joshua Alan Peterson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 83 days.

(21) Appl. No.: 16/951,787

(22) Filed: Nov. 18, 2020

(65) Prior Publication Data
US 2021/0164382 A1    Jun. 3, 2021

Related U.S. Application Data

(60) Provisional application No. 62/942,392, filed on Dec. 2, 2019.

(51) Int. Cl.
| | |
|---|---|
| *F01P 3/12* | (2006.01) |
| *F01P 3/22* | (2006.01) |
| *F01P 5/02* | (2006.01) |
| *F01P 11/04* | (2006.01) |
| *F02B 67/06* | (2006.01) |
| *F16F 15/14* | (2006.01) |
| *F16F 15/173* | (2006.01) |

(52) U.S. Cl.
CPC ............. *F01P 3/12* (2013.01); *F01P 3/22* (2013.01); *F01P 5/02* (2013.01); *F01P 11/04* (2013.01); *F02B 67/06* (2013.01); *F01P 2003/2214* (2013.01); *F01P 2005/025* (2013.01); *F16F 15/1442* (2013.01); *F16F 15/173* (2013.01); *F16F 2222/08* (2013.01); *F16F 2224/025* (2013.01); *F16F 2232/02* (2013.01); *F16F 2236/08* (2013.01)

(58) Field of Classification Search
CPC ........ F01P 3/12; F01P 3/22; F01P 5/02; F01P 11/04; F02B 67/06
See application file for complete search history.

(56) References Cited

U.S. PATENT DOCUMENTS

| | | | | |
|---|---|---|---|---|
| 1,320,430 | A | * 11/1919 | Wheeler | ............... F28F 1/126 138/172 |
| 2,594,555 | A | 4/1952 | Hardy | |
| 2,716,604 | A | 8/1955 | Bogart et al. | |
| 4,041,803 | A | 8/1977 | Goloff et al. | |
| 5,067,557 | A | * 11/1991 | Nuber | ..................... F16M 3/00 165/51 |

FOREIGN PATENT DOCUMENTS

| | | |
|---|---|---|
| DE | 10 2004 042240 A1 | 3/2006 |
| WO | 2018/181246 A1 | 10/2018 |
| WO | 2018/191410 A1 | 10/2018 |

OTHER PUBLICATIONS

European Patent Office, Search Report for related European Application No. EP 20 20 3528, dated Apr. 26, 2021.

* cited by examiner

*Primary Examiner* — Kevin A Lathers

(57) ABSTRACT

In one embodiment, a method for cooling an engine damper, including converting a gas to a liquid, and cooling an engine damper by passing the liquid through a tube portion located between fan air flow and the engine damper.

19 Claims, 3 Drawing Sheets

ENGINE DAMPER COOLING UTILIZING CAB A/C CIRCUIT

CROSS REFERENCE TO RELATED APPLICATION

This application claims the benefit of U.S. Provisional Application No. 62/942,392, filed Dec. 2, 2019, which is hereby incorporated by reference in its entirety.

TECHNICAL FIELD

The present disclosure is generally related to engine dampers, and, more particularly, operational temperature control involving engine dampers.

BACKGROUND

Dampers, including torsional vibration dampers, are used on many engines to reduce vibrations by converting energy to heat. Dampers often are constructed using an inertia ring in a viscous fluid (e.g., oils, grease, liquids with high silica content, etc., or an inertia ring cooperating with an elastomeric material), where torsional vibration (e.g., imposed by crankshaft forces) forces the fluid through narrow passages that dissipate the vibration as heat. This heat should be dissipated to keep the damper fluid functioning. Typically, engines are mounted behind a cooling packages that expend a considerable amount of heat, making it difficult to keep the engine damper cool. Efforts have focused on damper designs to alleviate high temperature effects, but sometimes conditions arise that present challenges in dissipating heat.

SUMMARY OF THE INVENTION

In one embodiment, a method for cooling an engine damper, comprising: converting a gas to a liquid; and cooling an engine damper by passing the liquid through a tube portion located between fan air flow and the engine damper.

These and other aspects of the invention will be apparent from and elucidated with reference to the embodiment(s) described hereinafter.

BRIEF DESCRIPTION OF THE DRAWINGS

Many aspects of an engine damper cooling system and method of the present disclosure can be better understood with reference to the following drawings. The components in the drawings are not necessarily to scale, emphasis instead being placed upon clearly illustrating the principles of an engine damper cooling system. Moreover, in the drawings, like reference numerals designate corresponding parts throughout the several views.

DESCRIPTION OF EXAMPLE EMBODIMENTS

Figure 1:
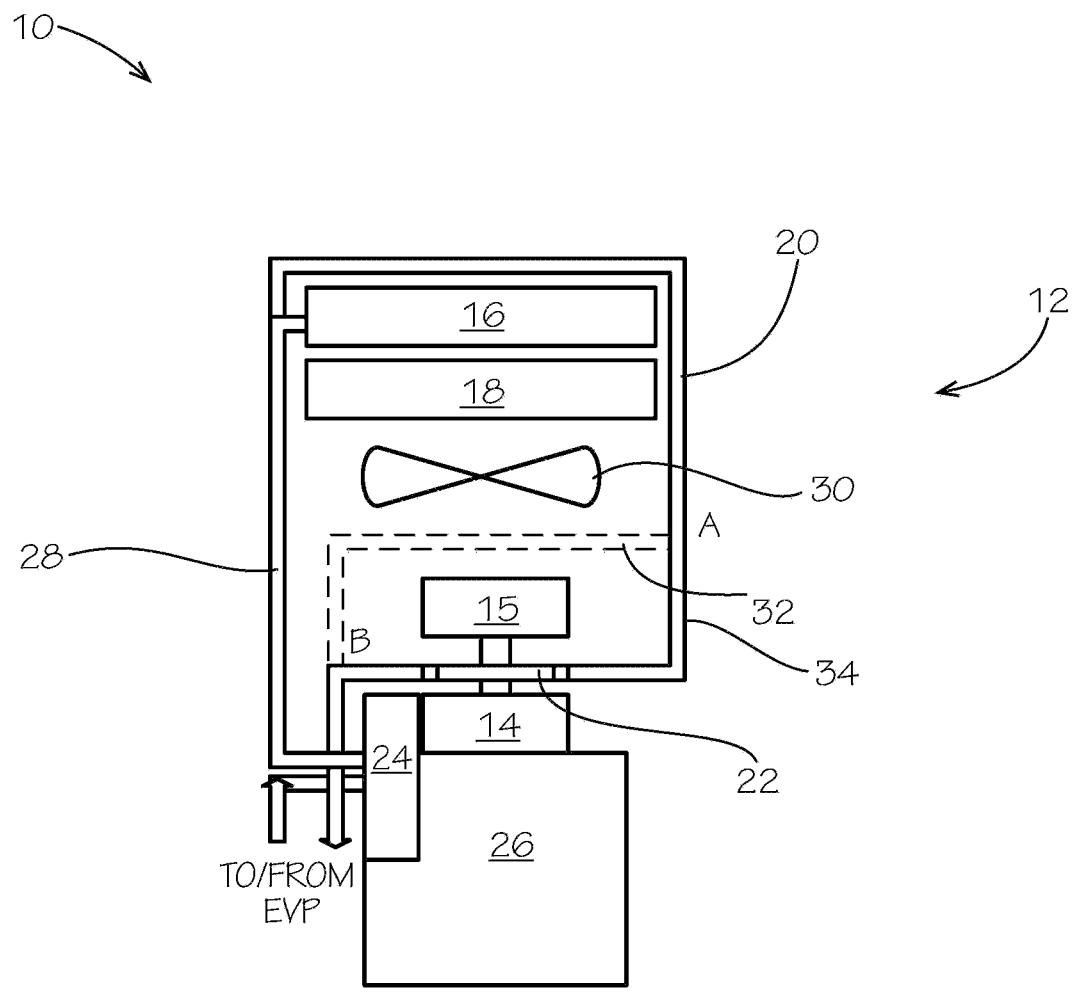
FIG. 1 is a schematic diagram that conceptually illustrates, in overhead plan, fragmentary view, an embodiment of an example engine damper cooling system.

Certain embodiments of an engine damper cooling system and method are disclosed that help reduce an operating temperature at or around an engine damper, enabling the viscous fluid of the engine damper to be maintained at acceptable operating temperatures. In one embodiment, the engine damper cooling system comprises an engine damper, and a temperature control system that converts gas (e.g., refrigerant) to a liquid, and passes the liquid through a tube portion located between air flow (e.g., from one or more fans) and the engine damper. In this way, the air flowing over the exterior of the tube portion is cooled (e.g., via convective cooling), reducing the air temperature around the engine damper.

Digressing briefly, current solutions for controlling the temperature of engine dampers focus on the design of the engine damper itself, which in of itself may not provide sufficient temperature control under some conditions (e.g., lower travel speed induced air flow). Certain embodiments of an engine damper cooling system may be used, with or without the benefits of specialized damper designs, to provide a cooler environment within which the engine damper may operate.

Having summarized various features of certain embodiments of an engine damper cooling system of the present disclosure, reference will now be made in detail to the detailed description of an engine damper cooling system as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the scope of an engine damper cooling system as defined by the appended claims. Further, it should be appreciated in the context of the present disclosure that the claims are not necessarily limited to the particular embodiments set out in the description.

FIG. 1 is a schematic diagram that conceptually illustrates, in overhead plan, fragmentary view, an embodiment of an example engine damper cooling system 10. The engine damper cooling system 10 may be part of an engine assembly for a vehicle of any one of a plurality of different types and/or uses, including incorporation into a tractor (e.g., the MT800 from AGCO), passenger vehicle, commercial truck, mining or construction vehicle, among other types of vehicles using wheels, tracks, or a combination thereof, for any one of a plurality of different recreational or commercial uses. For purposes of illustration, the engine damper cooling system 10 is described in the context of an agricultural tractor that uses a high horsepower (e.g., over 400 horsepower) engine at a relatively low travel speed (compared to a vehicle normally used in a highway environment). In such applications, the lower travel speed often results in a lower volume of air flow, which may give rise to excessive heat exposure to an engine damper without the benefit of an engine damper cooling system 10. However, it is appreciated that even when used in vehicles having improved air-flow conditions, the engine damper cooling system 10 may provide a benefit in prolonging the life of the engine damper and/or enabling efficient engine damper operation, and hence such vehicles are contemplated to be within the scope of the engine damper cooling system 10.

In the depicted embodiment, the engine damper cooling system 10 comprises a temperature control system 12 and an engine damper 14, the engine damper 14 connected on its outward face (e.g., via plural bolts) to a pulley 15. Note that in some embodiments, the connection between the engine damper 14 and the pulley 15 may be via a clutch mechanism (or in some embodiments, there may be no connection between the engine damper 14 and the pulley 15). It should be appreciated that the schematic depicted in FIG. 1 is a conceptual, fragmentary view that is used to facilitate an understanding of operations of the engine damper cooling system 10, and that one having ordinary skill in the art would understand that an engine and associated cooling system comprises a plurality of known components including electrical wiring, additional tubing/hoses, valves, solenoids, refrigerant containers, a charge air cooler, oil cooler, fuel cooler, accumulators, receiver dryers, among other known components.

The engine damper 14 may comprise a torsional vibration damper constructed using an inertia ring in a viscous fluid or an inertia ring cooperating with an elastomeric material. Certain embodiments of an engine damper cooling system 10 cool the air at and/or around the engine damper 14, which maintains the viscous fluid and/or elastomeric material at an acceptable operating temperature (e.g., 120 C, though not limited to this temperature specification) despite low travel speeds (and hence low air flow due to travel speeds). As indicated above, certain embodiments of an engine damper cooling system 10 may be beneficial for other types of vehicles.

The temperature control system 12 comprises, beginning at the front of the engine damper cooling system 10, a condenser 16, a radiator 18, and a plurality of hoses/tubing (hereinafter, tube(s) or tubing) that enable closed loop fluid flow, the fluid (e.g., gas, liquid) including air conditioning refrigerant (e.g., HFC-134a, HFC-152a, newer climate friendly refrigerants, etc.). There is also fluid flow (e.g., of engine coolant) that is achieved via a plurality of tubes and the radiator 18, though discussion of these known systems (and others, such as vacuum systems, other heat exchangers, etc.) is omitted here to avoid obfuscating principles of the present disclosure. In one embodiment of the engine damper cooling system 10, a tube 20 is coupled to an outlet of the condenser 16 and is routed past an outward face of the engine damper 14, wherein a portion 22 of the tube 20 is routed adjacent to (proximal to) the outward face of the engine damper 14. For instance, the portion 22 is routed at least partially between the pulley 15 and the engine damper 14, past which the tube 20 is routed to an evaporator (e.g., via an orifice tube or expansion valve), not shown in FIG. 1. From the evaporator, fluid is routed to a compressor 24 that is mounted to an engine 26 and driven by the pulley 15 (which in turn is driven by the crankshaft of the engine 26), and from the compressor 24, back to the condenser 16 via tube 28. The temperature control system 12 further comprises a fan 30 (e.g., a radiator cooling fan). In some embodiments, the fan 30 may be arranged relative to the engine damper 14 such that most of the air flow, of which the tube portion 22 is exposed, is primarily from a lower portion of the fan 30. In some embodiments, more or less area of the fan 30 may primarily contribute to the air flow received by the tube portion 22 (and hence the fluid flowing within).

In one example operation, the compressor 24 is powered by the engine 26 via a pulley 15 (e.g., to drive a serpentine or other arrangements of belt(s)), internally pressurizing the refrigerant. The compressor 24 comprises a low pressure-side port and a high pressure-side port, with the low pressure-side port connected to the evaporator (via a hose) and the high pressure-side port connected to the condenser 16 (via the tube 28). Note that in some embodiments, a compressor may be used that is powered electrically (e.g., in hybrid engines via a battery, where the refrigerant is pressurized using a motor integral to the compressor). In such embodiments, the pulley 15 may not be connected to the engine damper 14. The condenser 16 is located in front of the engine radiator 18 and cools the refrigerant flowing from the compressor 24 before it heads to the evaporator. In some embodiments, the temperature control system 12 comprises plural (e.g., two) fans (e.g., a separate fan for the condenser 16 instead of using the radiator cooling fan 30, or an additional fan to help the radiator fan 30 cool the refrigerant). The fan 30 draws air through the condenser 16 and radiator 18. The evaporator is typically used in conjunction with an expansion valve or orifice tube, which cools the high pressure liquid refrigerant. When the temperature control system 12 is inactive, the refrigerant exists as a low pressure gas. Once activated, the compressor 24 increases the refrigerant to a high pressure, hot gas (e.g., 120-125 C), and when the refrigerant passes through the condenser 16, the gas is converted or transformed to a warm, high pressure liquid (e.g., 40-45 C). The air flowing over the exterior of the tube portion 22 is cooled, which in turn cools the surrounding air of the engine damper 14 as the refrigerant liquid passes through the tube portion 22 of the tube 20. The liquid passes through the expansion valve/orifice to a low pressure gas within the evaporator, the further cooled air distributed via a ventilation system and blower to cool a cab of the vehicle. The gas flows through the compressor 24, and the temperature control operation is repeated.

In one embodiment, the tube 20 is connected to the condenser outlet, and is routed past and proximal to the outward (e.g., front) face of the engine damper 14 where air flow from the fan 30 passes over the tube portion 22, convectively cooling the air surrounding the engine damper 14. The tube 20 is routed toward the evaporator. In some embodiments the tube 20 branches off (e.g., via a tee fitting, valve, etc.) at or around point A as shown in FIG. 1, resulting in a main portion 32 and a bypass portion 34. The bypass portion 34 is routed past the front of the engine damper 14 and the main portion 32 (e.g., having a greater flow capacity, though not necessarily in all embodiments) is routed in a different manner (e.g., passes forward of and beneath the pulley 15). In other words, the bypass portion 34 and main portion 32 are fluidly coupled to each other and the tube 20, and the bypass portion 34 and the main portion 32 are arranged in parallel, joining back together (e.g., via a fitting, valve, etc.) at point B as shown in FIG. 1. Note that the illustrated locations of points A and B are used as one example, and that in some embodiments, other locations and/or a different routing of the tubes 32 and 34 may be implemented as long as at least a portion of the fluid flowing from the condenser 16 passes proximal to the front face (e.g., disposed between the pulley 15 and engine damper 14) of the engine damper 14 and the fluid carrying tube is exposed to the air flow of the fan 30 to enable convective cooling of the air over the exterior of the tubing and hence the surrounding air of the engine damper 14. Further, the routing of tubes to and from the evaporator are also merely illustrative, and that in some embodiments, other routing arrangements may be used. In one embodiment, the tube portion 22 may be supported using a harness or other known support structure coupled to the frame of the vehicle. In some embodiments, the tube portion 22 may be supported from a harness or other support structure coupled to the engine 26.

Figure 2:
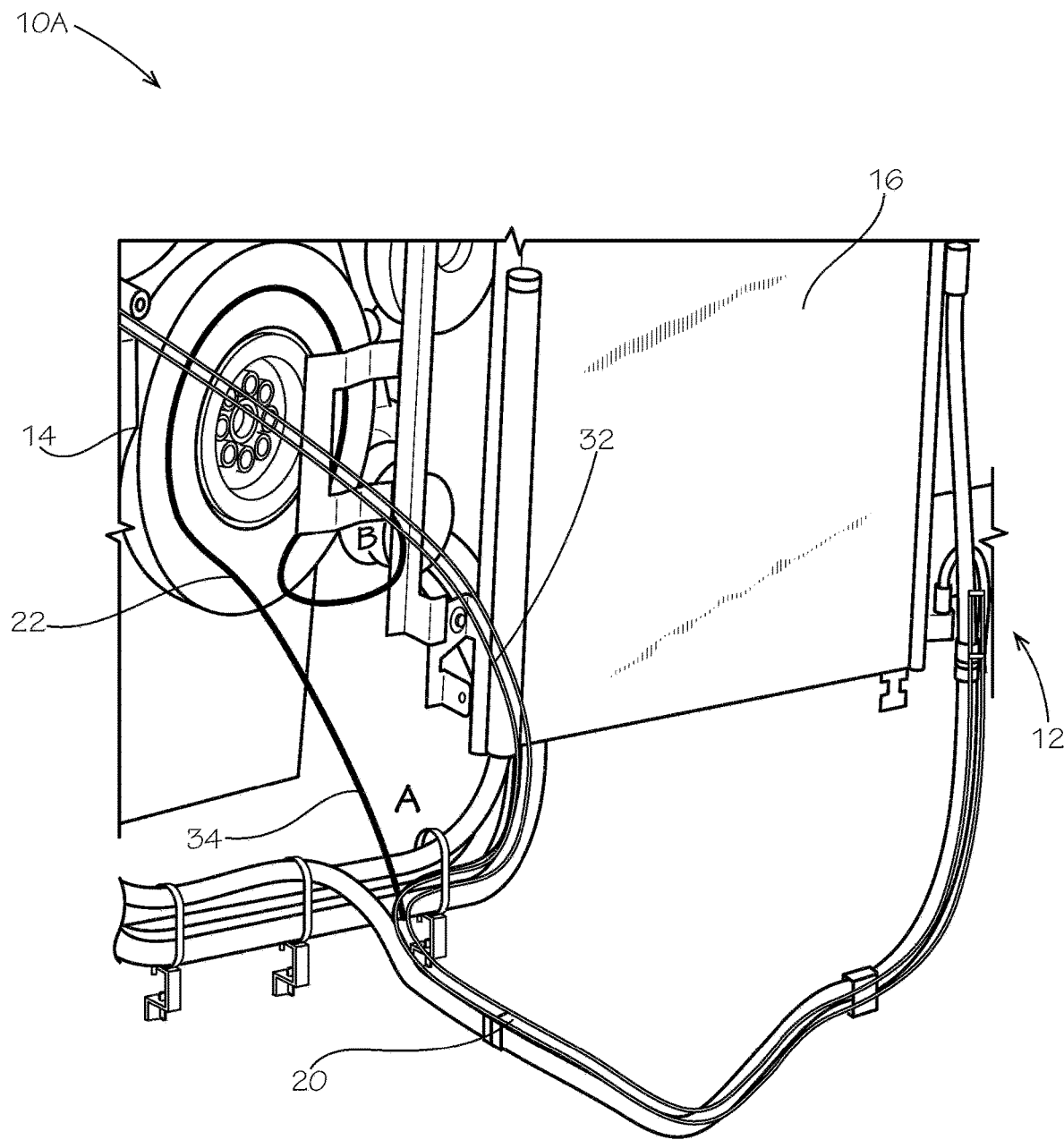
FIG. 2 is a schematic diagram that illustrates, in isometric view, select components of an embodiment of an example engine damper cooling system.

Referring now to FIG. 2, shown are select components of an embodiment of an engine damper cooling system 10A, similar to that shown in FIG. 1. In particular, shown is one example arrangement of the engine damper 14 relative to certain components of the temperature control system 12. The pulley 15 is omitted from FIG. 2 to better illustrate an example configuration for the tube portion 22. Note that in some embodiments, a damper may be used that integrates the pulley assembly. As shown, in one embodiment, the tube 20 is routed from (a lower end of) the condenser 16 to an area proximal to the outward face of the engine damper 14 and then beyond toward the evaporator. In one example arrangement, the tube portion 22 adjacent the engine damper 14 is routed circumferentially in front of the engine damper 14 to expose as much of the tube portion 22 (and hence fluid flowing within) to air flow from the fan 30 (FIG. 1) as possible to enable convective cooling of the tubing surface to the surrounding air. In other words, the tube portion 22 is routed in a manner that is substantially concentric (e.g., almost entirely fashioned in a circle) to the outward or front face of the engine damper 14. In one embodiment, the tube 20 may be made of a different material than the material used for other refrigerant tubes (e.g., tube 28). In one embodiment, the tube 20 is comprised of a metal material or a mix of metal material and elastomeric material or nylon or other material or combinations of materials. In some embodiments, only the tube portion 22 is comprised of the metal-based material, with an additional or intermediary tube of a different material (e.g., elastomeric) fluidly coupled (and physically coupled, such as via a fitting) between the tube portion 22 (e.g., at point A) and the condenser 16 and/or between the tube portion 22 (at point B) and the evaporator (or valve/orifice). In embodiments where a main portion 32 and bypass portion 34 are used, the main portion 32 may be comprised of non-metal material (e.g., an elastomeric material), and the bypass portion 34 may be comprised of a metal or metal mix type material as described above. In some embodiments, the tube portion 22 (including the bypass portion 34 in some embodiments) includes one or more heat exchange structures. In one embodiment, the heat exchange structures may include attached (e.g., soldered) or integrated (e.g., embedded) fins or fin tubes, corrugated tubes, among others. An example of some types of heat exchange structures may be similar to those provided by Unity Tube in East Palestine, Ohio. Note that in embodiments that do not use the parallel arrangement of the bypass portion 34 and the main portion 32, the main portion 32 is omitted (e.g., the tube 20 enables fluid flow from the condenser 16, through the portion 22, and to the evaporator, and hence no branching).

Figure 3:
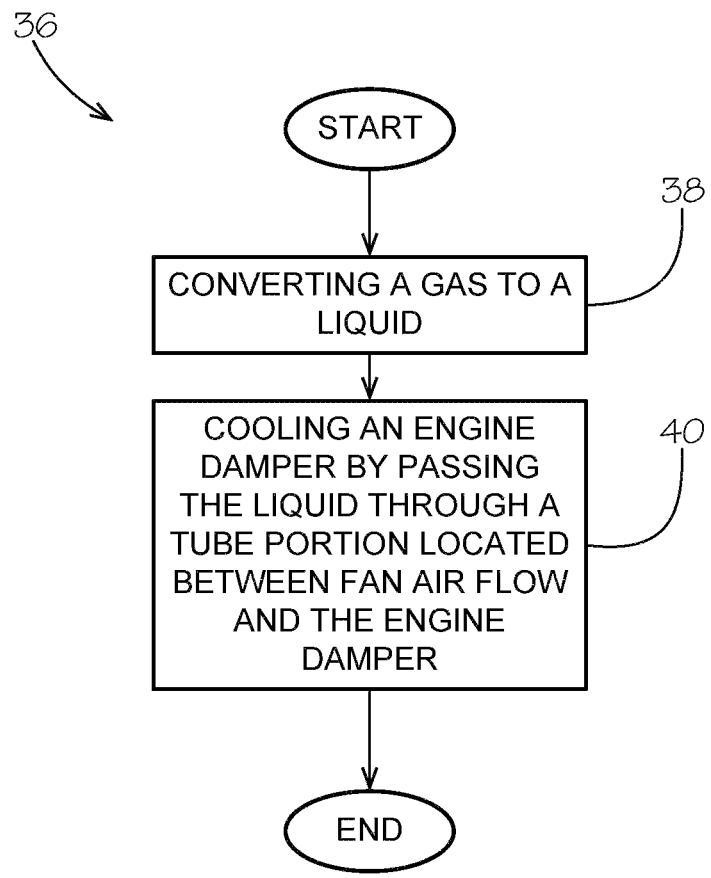
FIG. 3 is a flow diagram that illustrates an embodiment of an example engine damper cooling method.

In view of the various embodiments of an engine damper cooling system (e.g., systems 10, 10A) described herein, it should be appreciated that one embodiment of an example damper engine cooling method, denoted as method 36 and depicted in FIG. 3 between start and end steps, comprises converting a gas to a liquid (38), and cooling an engine damper by passing the liquid through a tube portion located between fan air flow and the engine damper (40). For instance, the conversion (38) may be achieved via the inherent operations of the condenser 16 (FIG. 1), and the cooling of the air over an exterior surface of the tube by fan air flow (or air flow from plural fans), and the resultant cooled air of and around the engine damper, enables operation of the engine damper at an acceptable operating temperature.

While certain embodiments of the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality. Any reference signs in the claims should be not construed as limiting the scope.

The invention claimed is:

1. A system, comprising:
an engine damper;
a temperature control system comprising at least one fan and plural hoses that enable closed loop fluid flow, wherein at least a portion of a first hose of the plural hoses is proximal to an outward face of the engine damper and disposed between the at least one fan and the engine damper, the system configured such that, in use, air flowing from the fan over an exterior of the at least a portion of the first hose is cooled, thereby reducing the air temperature around the engine damper.

2. The system of claim 1, further comprising a condenser, wherein the first hose is coupled between an outlet of the condenser and an inlet to an evaporator.

3. The system of claim 2, wherein the first hose is coupled to one or both of the condenser and the evaporator via an intermediate hose or intermediate hoses, respectively.

4. The system of claim 3, wherein the first hose comprises a first material and the intermediate hose or hoses comprises a second material that is of a different material than the first material.

5. The system of claim 1, further comprising a pulley adjacent to the engine damper, wherein the pulley is located between the at least one fan and the at least the portion of the first hose.

6. The system of claim 1, wherein the first hose is comprised of a metal material.

7. The system of claim 1, wherein the first hose comprises one or more heat exchange structures.

8. The system of claim 7, wherein the one or more heat exchange structures comprise one or more fins.

9. The system of claim 1, wherein the at least the portion of the first hose is arranged substantially concentric to the outward face of the engine damper.

10. The system of claim 1, wherein the temperature control system comprises plural fans.

11. The system of claim 1,
the plural hoses comprising a bypass hose and a main hose, the bypass hose coupled to and arranged in parallel with the main hose, wherein the bypass hose is proximal to an outward face of the engine damper and disposed between the at least one fan and the engine damper.

12. The system of claim 11, wherein the bypass hose comprises a first material and the main hose comprises a second material that is of a different material than the first material.

13. The system of claim 11, further comprising a pulley adjacent to the engine damper, wherein the pulley is located between the at least one fan and the bypass hose.

14. The system of claim 11, wherein the bypass hose is comprised of a metal material.

15. The system of claim 11, wherein the bypass hose comprises one or more heat exchange structures.

16. The system of claim 15, wherein the one or more heat exchange structures comprise one or more fins.

17. The system of claim 11, wherein the bypass hose is arranged substantially concentric to the outward face of the engine damper.

18. The system of claim 11, wherein the temperature control system comprises plural fans.

19. A method for cooling an engine damper, comprising:
converting a gas to a liquid in a temperature control system comprising at least one fan and plural hoses that enable closed loop fluid flow, wherein at least a portion of a first hose of the plural hoses is proximal to an outward face of an engine damper and disposed between the at least one fan and the engine damper; and
reducing an air temperature around the engine damper by passing the liquid through the at least a portion of the first hose such that air flow from the at least one fan is cooled as it passes over the exterior of the at least a portion of the first hose, reducing the air temperature around the engine damper.

* * * * *